United States Patent
Wang et al.

(10) Patent No.: US 10,581,352 B2
(45) Date of Patent: Mar. 3, 2020

(54) METHOD AND APPARATAE FOR CONTROLLING AND PROVIDING A VOLTAGE CONVERTER WITH A PULSE-MODULATED SWITCH

(71) Applicant: Moog Inc., East Aurora, NY (US)

(72) Inventors: Eryu L. Wang, Clarence, NY (US); Kenneth M. Newbury, Orchard Park, NY (US); Michael J. Willers, Killeagh (IE); Thomas R. Kowalewski, Akron, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/427,881

(22) PCT Filed: Mar. 15, 2013

(86) PCT No.: PCT/US2013/032335
§ 371 (c)(1),
(2) Date: Mar. 12, 2015

(87) PCT Pub. No.: WO2014/042690
PCT Pub. Date: Mar. 20, 2014

(65) Prior Publication Data
US 2015/0229255 A1 Aug. 13, 2015

Related U.S. Application Data

(60) Provisional application No. 61/700,358, filed on Sep. 13, 2012.

(51) Int. Cl.
*H02P 7/18* (2006.01)
*H02M 3/156* (2006.01)
(Continued)

(52) U.S. Cl.
CPC ............. *H02P 7/18* (2013.01); *H02M 3/156* (2013.01); *H02P 29/10* (2016.02); *H02P 29/64* (2016.02); *H02P 29/68* (2016.02)

(58) Field of Classification Search
CPC .. H02P 6/085; H02P 6/008; H02P 7/28; H02P 27/08; H02M 7/53875
(Continued)

(56) References Cited

U.S. PATENT DOCUMENTS

| 4,309,650 A | 1/1982 | Boros et al. |
| 5,606,948 A | 3/1997 | Gonnering |

(Continued)

FOREIGN PATENT DOCUMENTS

| CN | 1423409 A | 6/2003 |
| GB | 2406006 A | 3/2005 |

(Continued)

OTHER PUBLICATIONS

International Search Report and Written Opinion of the International Searching Authority (European Patent Office) dated Oct. 25, 2013.

(Continued)

*Primary Examiner* — Rina I Duda
(74) *Attorney, Agent, or Firm* — Harter Secrest & Emery LLP

(57) ABSTRACT

An improved apparatus for controlling and providing a pulse-width-modulated signal to a switch operatively arranged between two terminals of a power supply for controlling an output power. A controller provides a pulse-width-modulated gate signal at a frequency to the switch. The controller is arranged to adjust the frequency as a function of a sensed parameter such that the power dissipated in the switch during switch transitions may be adjusted.

11 Claims, 11 Drawing Sheets

(51) Int. Cl.
*H02P 29/68* (2016.01)
*H02P 29/10* (2016.01)
*H02P 29/64* (2016.01)

(58) Field of Classification Search
USPC .... 318/599, 811, 400.29; 388/800, 811, 819
See application file for complete search history.

(56) References Cited

U.S. PATENT DOCUMENTS

| | | | |
|---|---|---|---|
| 5,610,453 A * | 3/1997 | Smith | H02H 6/00 307/116 |
| 5,659,235 A * | 8/1997 | Yamada | B60L 15/025 318/139 |
| 5,744,927 A | 4/1998 | Hayashida | |
| 5,818,192 A | 10/1998 | Nozari | |
| 5,875,414 A * | 2/1999 | Tsutsumi | H02M 1/32 702/99 |
| 5,923,135 A * | 7/1999 | Takeda | B60L 11/1803 318/432 |
| 6,147,465 A * | 11/2000 | Hollenbeck | H02P 6/20 318/400.08 |
| 6,499,960 B2 * | 12/2002 | Chen | F04D 27/004 165/80.3 |
| 6,949,006 B1 | 9/2005 | Chen et al. | |
| 7,138,781 B2 * | 11/2006 | Murray | G05D 23/1919 318/400.04 |
| 7,141,950 B1 * | 11/2006 | Verge | H05K 7/20209 318/400.09 |
| 7,193,377 B2 * | 3/2007 | Fung | H02P 7/29 318/400.01 |
| 7,245,097 B2 * | 7/2007 | Someya | H02P 1/28 318/400.11 |
| 7,312,521 B2 * | 12/2007 | Noma | H01L 23/3114 257/621 |
| 7,456,597 B2 | 11/2008 | Kanamori | |
| 7,555,313 B2 * | 6/2009 | Vaananen | H04B 1/3877 455/41.1 |
| 7,714,524 B2 * | 5/2010 | Frankel | H02P 5/68 318/266 |
| 7,795,827 B2 * | 9/2010 | Jeung | H02P 6/085 235/454 |
| 7,830,104 B2 * | 11/2010 | Takeuchi | H02P 6/20 318/400.01 |
| 7,898,198 B2 * | 3/2011 | Murphree | H02P 23/03 318/432 |
| 8,018,176 B1 | 9/2011 | Small et al. | |
| 8,089,234 B2 * | 1/2012 | Takizawa | B60L 15/00 318/139 |
| 8,138,711 B2 * | 3/2012 | Hwang | F24F 11/0076 318/471 |
| 2007/0098374 A1 | 5/2007 | Fujiwara | |
| 2008/0315814 A1 * | 12/2008 | Takizawa | B60L 15/00 318/434 |
| 2009/0102405 A1 * | 4/2009 | Hwang | H02P 29/60 318/400.15 |
| 2010/0132798 A1 | 6/2010 | Malaney et al. | |
| 2010/0171456 A1 * | 7/2010 | Chakrabarti | H02M 7/53875 318/461 |
| 2010/0250067 A1 | 9/2010 | Matsumura et al. | |
| 2011/0193506 A1 * | 8/2011 | Hayashi | H02P 29/02 318/400.12 |

FOREIGN PATENT DOCUMENTS

| | | |
|---|---|---|
| JP | H04210797 A | 7/1992 |
| JP | H089677 A | 1/1996 |
| JP | 2003049669 A | 2/2003 |
| JP | 2004359173 A | 12/2004 |
| JP | 2005198391 A | 7/2005 |
| JP | 3707244 B2 | 10/2005 |
| JP | 3812299 B2 | 8/2006 |
| JP | 2010120516 A | 6/2010 |

OTHER PUBLICATIONS

Islam et al., "Fuzzy Logic Enhanced Speed Control System of a VSI-Fed Three Phase Induction Motor," *2005 2nd International Conference on Electrical and Electronics Engineering (ICEEE)*, 2005, 296-301, IEEE Cat. No. 05EX1097.

Arrofiq et al., "PLC-Based Fuzzy Logic Controller for Induction-Motor Drive With Constant V/Hz Ratio," *2007 International Conference on Intelligent and Advanced Systems*, 2007, 93-8.

Turner et al., "Dynamic Frequency Scaling to Improve Converter Efficiency," *2007 Australian Universities Power Engineering Conference*, 2007, 1-5.

\* cited by examiner

METHOD AND APPARATAE FOR CONTROLLING AND PROVIDING A VOLTAGE CONVERTER WITH A PULSE-MODULATED SWITCH

CROSS-REFERENCE TO RELATED APPLICATION

This application claims priority benefit of U.S. Provisional Patent Application No. 61/700,358 filed Sep. 13, 2012, entitled "Methods and Apparatae for Controlling and Providing a Pulse-Width-Modulated Signal to a Switch," which is incorporated herein by reference.

FIELD OF THE INVENTION

The present invention relates generally to pulse-width-modulated ("PWM") control techniques for switches, and, more particularly, to improved methods of, and apparatae for, controlling and providing a PWM signal to a switch.

BACKGROUND OF THE INVENTION

PWM techniques for controlling the supply of power to various loads, such as electric motors, are well known. One example is taught in a publication, Turner, Duke and Walton, "Dynamic Frequency Scaling to Improve Converter Efficiency", Power Engineering Conference, 2007, AUPEC 2007.

BRIEF SUMMARY OF THE INVENTION

With parenthetical reference to the corresponding parts, portions or surfaces of the disclosed embodiment, merely for purposes of illustration and not by way of limitation, the present invention broadly provides improved methods (200, 300, 400) and apparatae (101) for controlling and providing a pulse-width-modulated signal to a switch network (126).

In one aspect, the improved method comprises the steps of: providing a circuit having two power supply terminals and having a switch operatively arranged between the two power supply terminals, the circuit controlling output power (204, 304); providing a pulse-width-modulated signal at a frequency to the switch (207, 308); and receiving a parameter (201, 301); adjusting the frequency as a function of the parameter (210, 310); whereby the power dissipated in the switch during switch transitions is changed.

The method further may include the step of providing the output power to a load (307). The load may be a motor having one member (e.g., a rotor) mounted for movement relative to another member (e.g., a stator). The parameter may be a temperature of the circuit, a temperature of the motor, or the speed (rotational or linear) of one member relative to the other member. The method may further include the step of comparing the parameter to a threshold value (313), wherein the function causes the frequency to be adjusted if the parameter is less than the threshold value. The method may further comprise the step of comparing the parameter to a threshold value (313), wherein the function causes the frequency to be adjusted if the parameter is less than or equal to the threshold value, and wherein the threshold value is a stall speed of the motor.

In another aspect, the improved method (300) comprises the steps of: providing a circuit having two power supply terminals and having a switch operatively arranged between the two power supply terminals, the circuit controlling an output power (304); receiving a parameter; comparing the parameter to a threshold value; providing a first pulse-width-modulated gate signal to the switch at a first frequency if the parameter is below a threshold value; and providing a second pulse-width-modulated gate signal to the switch at a second frequency if the parameter is above the threshold value.

The parameter may be selected from a group consisting of an output current, a switch current, a switch temperature, a temperature of a load driven by the output power, an output voltage, a speed of an electric motor driven by the output power, a position of an actuator driven by the output power, a torque of an actuator driven by the output power, and a force of an actuator driven by the output power. The circuit may be connected to an electric motor having one member mounted for movement relative to another member.

In still another aspect, the improved method (400) comprises the steps of: receiving a target voltage (401); generating a square wave signal having a series of pulses at a carrier frequency (404), wherein the width of each pulse is a function of the target voltage; sensing a parameter (407); providing a circuit having a switch adapted to be operatively arranged between two terminals of a power supply for controlling an output power (410); providing the square wave signal to the switch; and adjusting the carrier frequency as a function of the sensed parameter such that the power efficiency of the switch during switch transitions is changed (413).

In still another aspect, an improved apparatus (101) for providing a control signal to a circuit having a switch operatively associated with a power supply (120) and a load (135) comprises a sensor (129, 138) operatively arranged to sense the value of a parameter (130, 139) of one of the circuit and the load; a controller (123) that provides a pulse-width-modulated control signal (124) at a frequency to the switch, the controller in communication with the sensor and arranged to adjust the frequency as a function of the sensed parameter; whereby the power dissipated in the switch during switch transitions is adjusted.

The load may be an electric motor having one member mounted for movement relative to another member. The sensor may be arranged to sense a parameter selected from the group consisting of a load current, a switch current, a switch temperature, a load temperature, an output voltage, a load speed, a load position, a load torque, and a load force. The network may comprise an IGBT, a power transistor, a MOSFET, and an active diode. The controller may comprise a CPU, a microprocessor, a microcontroller, a programmable logic device, and an integrated circuit. The apparatus may further include a power supply having two terminals. The power supply may be arranged to provide either direct or alternating current. The apparatus (101) may further comprise a memory (142) for storing a threshold value of a sensed parameter (145, 147); and a comparator (123) for comparing the value of the sensed parameter with the stored threshold value; wherein the controller is arranged to provide the pulse-width-modulated control signal at a first frequency (149) when the sensed parameter value is greater than the stored threshold parameter value; and wherein the controller is arranged to provide the pulse-width-modulated control signal at a second frequency (151) when the sensed parameter is less than or equal to the stored threshold value, the second frequency being different from the first frequency. The circuit may comprise an H-bridge (526).

In another aspect, an apparatus for controlling and providing pulse-width-modulated signals comprises: a switching network (126) having at least one switch operatively arranged between two terminals of a power supply (120) for controlling an output power (132); a controller (123) for providing a pulse-width-modulated switch control signal (124) at a frequency (149) to the switch; a sensor (129, 138) in communication with the controller and operatively arranged to sense the value of a parameter; and means for adjusting the frequency as a function of the parameter to cause the power efficiency of the switch during switch transitions to be changed.

In another aspect, the improved method for operating a voltage converter with a pulse-width-modulated switch comprises the steps of: providing a circuit having a power supply input having two power supply lines and having a switch operatively arranged between the two power supply lines, the circuit controlling output power; connecting a variable power supply to the power supply input; providing a pulse-width-modulated signal at a frequency to the switch; providing a power supply command to the variable power supply; receiving a sensed parameter; and adjusting the power supply commend as a function of the parameter; whereby a power efficiency of the switch during switch transitions is adjusted.

The variable power supply may be a voltage source and the power supply command may be a voltage commend. The variable power supply command may be a current command. The sensed parameter may be a switch temperature. The step of adjusting the power supply command may comprise the steps of comparing the sense parameter to a threshold and providing a first power supply command to the variable power supply when the sense parameter is greater than the threshold and providing a second power supply command to the variable power supply when the sense parameter is less than the threshold. The method may further comprise the step of adjusting the frequency as a function of the sensed parameter. The first frequency may be fixed.

DESCRIPTION OF THE PREFERRED EMBODIMENTS

Figure 1A:
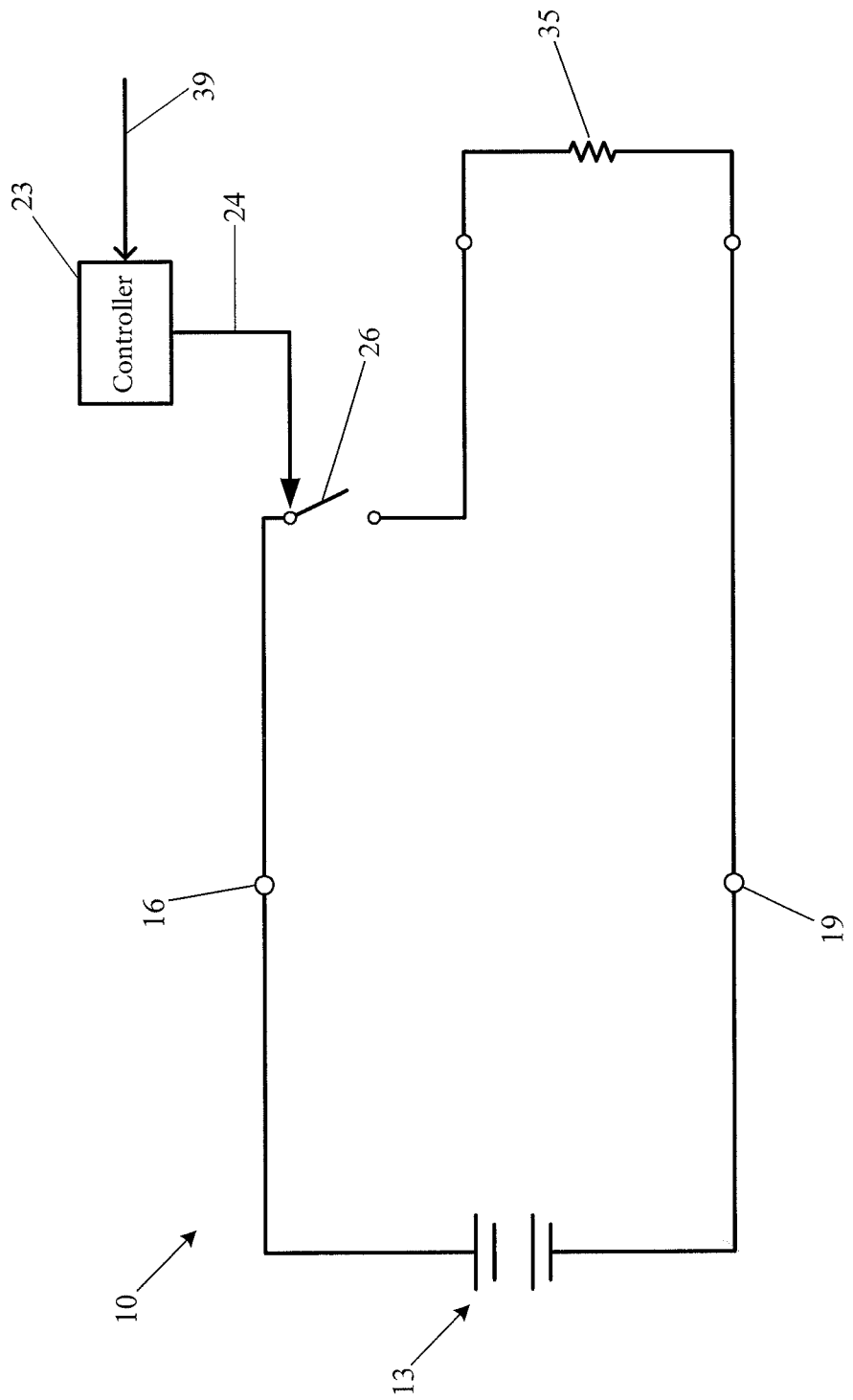
FIG. 1A is a circuit diagram of a first embodiment.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1A thereof, an apparatus 10 provides for controlling and providing a pulse-width-modulated (PWM) gate signal 24 to a switch 26. Apparatus 10 includes a power supply 13 having a first terminal 16 and a second terminal 19. A switch 26 is operatively arranged between the terminals 16, 19. A load 35 is connected in series with the switch 26. A controller 23 sends a PWM gate signal 24 to the switch 26. Controller 23 receives a feedback signal 39. The PWM gate signal 24 may be generated at different frequencies as will be described in greater detail below. The controller 23 may change the frequency of the PWM gate signals 24 depending on information contained in feedback signal 39 received from sensors that monitor certain parameters of the circuit and/or the load 35.

Figure 1B:
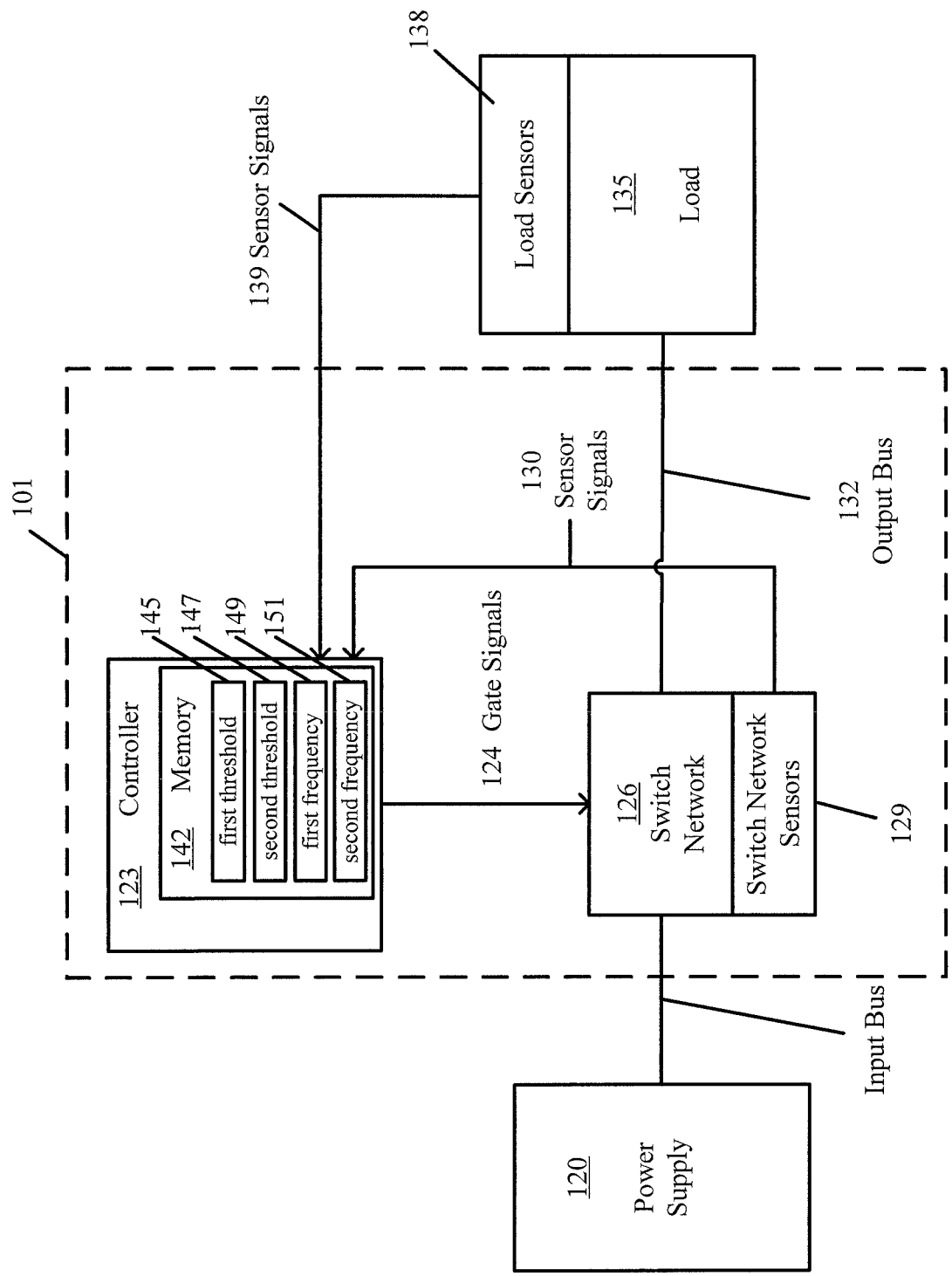
FIG. 1B is a block diagram of an apparatus for controlling and providing a PWM signal to a switch.

As shown in FIG. 1B, apparatus 101 receives power from power supply 120, receives sensor signals 139 from load sensor block 138, and provides output bus 132 to load 135. Apparatus 101 contains the major components of controller 123, switch network 126, and switch sensor block 129. Switch network 126 contains at least one switch, such as a solid-state-switch, an active diode, a thyristor, a relay, or a transistor such as a BJT, MOSFET, IGBT, JFET, or other similar transistor. Switch network 126 may contain only one transistor. Switch sensor block 129 contains at least one sensor which senses current, temperature, voltage, energy loss, power, efficiency, or some other parameter of switch network 126. Sensor block 129 provides sensor readings to controller 123 via line 130.

Controller 123 is arranged to supply at least one gate signal via line 124 to switch network 126. Controller 123 includes a processor, microcontroller, programmable logic controller, CPU, microprocessor, or some other similar component. Controller 123 includes memory 142, which receives and stores the key variables of first threshold value 145, second threshold value 147, first carrier frequency 149, and second carrier frequency 151.

Apparatus 101 is operatively arranged to selectively supply an output power via output bus 132 to load 135. In this embodiment, load 135 is an electrical motor and load sensor 138 measures motor speed. However, apparatus 101 may be used with other types of electrical loads. In one form, load 135 is a multi-phase electrical motor having a rotor rotatably mounted for movement relative to a stator, and output bus 132 is a multiphase bus with a voltage line for each phase and a voltage line for voltage ground. In another form, load 135 is a linear motor having one member movable relative to another member. Load 135 need not be a rotary or linear motor, and may take other forms as well. Load sensor 138 is operatively arranged to sense a parameter of load 135 and to supply parameter measurements via line 139 to controller 123. Load sensor 138 is configured to measure a speed, torque, current, temperature, or other parameter of load 135.

Power supply 120 preferably has two terminals and is connected to switch network 126 through an input voltage bus 121.

Controller 123 is configured to provide PWM gate signals 124 to switch network 126 as a function of the feedback sensor signal line 130 and/or feedback sensor signal line 139. In this embodiment, PWM gate signals are produced with a carrier frequency which is varied as a function of sensor signal 139. More specifically, PWM gate signals are produced with a carrier frequency set to equal first frequency 149 when sensor signal 139 is a motor speed having a value above first threshold 145. Alternatively, PWM gate signals are produced with a carrier frequency equal to second frequency 151 when sensor signal 139 is a value equal to or below said first threshold 145.

The specific operation of apparatus 101 begins with controller 123 reading the value on sensor signal 139. Signal 139 is then compared to first threshold 145. If signal 139 is greater than first threshold 145, gate signals 124 are produced with first frequency 149. If signal 139 is less than first threshold 145, gate signals are produced with second frequency 151. For example, in the first embodiment, as described above, load 135 may be an electric motor, and sensor signal 139 may represent a motor speed. In the first embodiment, it may be desirable to change the PWM frequency from a high frequency (first frequency 149) to a low frequency (second frequency 151) when the motor's speed (signal 139) is less than a nominal rotation rate (first threshold 145). Controller 123 is configured to periodically resample sensor signal 139 and readjust the PWM frequency as described.

Figure 2:
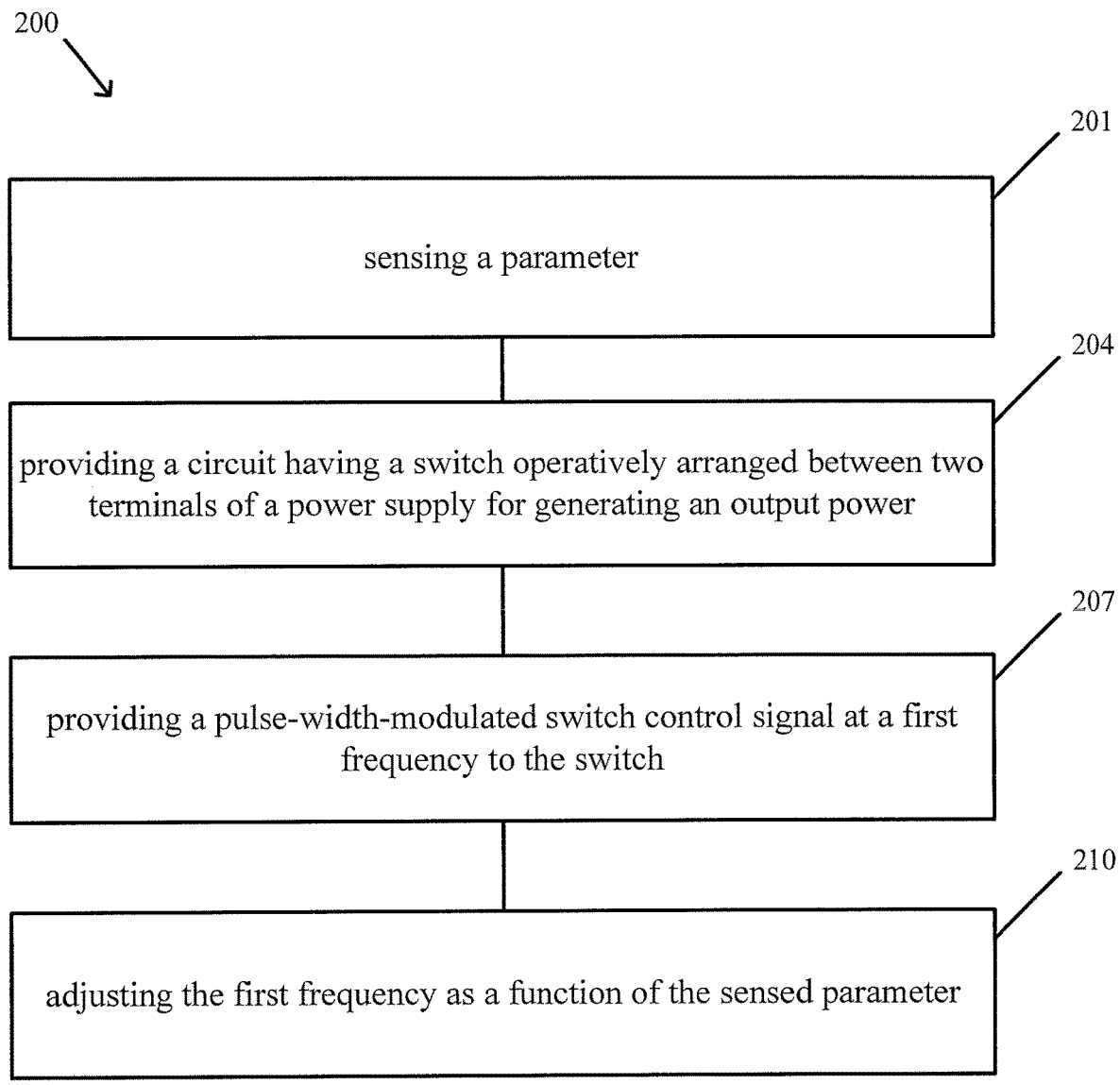
FIG. 2 is a block diagram showing a series of steps used in practicing a first method.

FIG. 2 is a flow diagram of a method 200 of operating apparatus 101. Method 200 includes the steps of: sensing a parameter (as indicated in box 201); providing a circuit having a switch operatively arranged between two terminals of a power supply for generating an output power (as indicated in box 204); providing a PWM switch control signal at a first carrier frequency to the switch (as indicated in box 207); and adjusting the first frequency as a function of the sensed parameter (as indicated in box 210).

Where the load is a motor, the threshold value may be a certain predetermined rotational speed of one member relative to another member. For example, the threshold may be set to represent a stalled or near-stalled condition of the motor.

Figure 3:
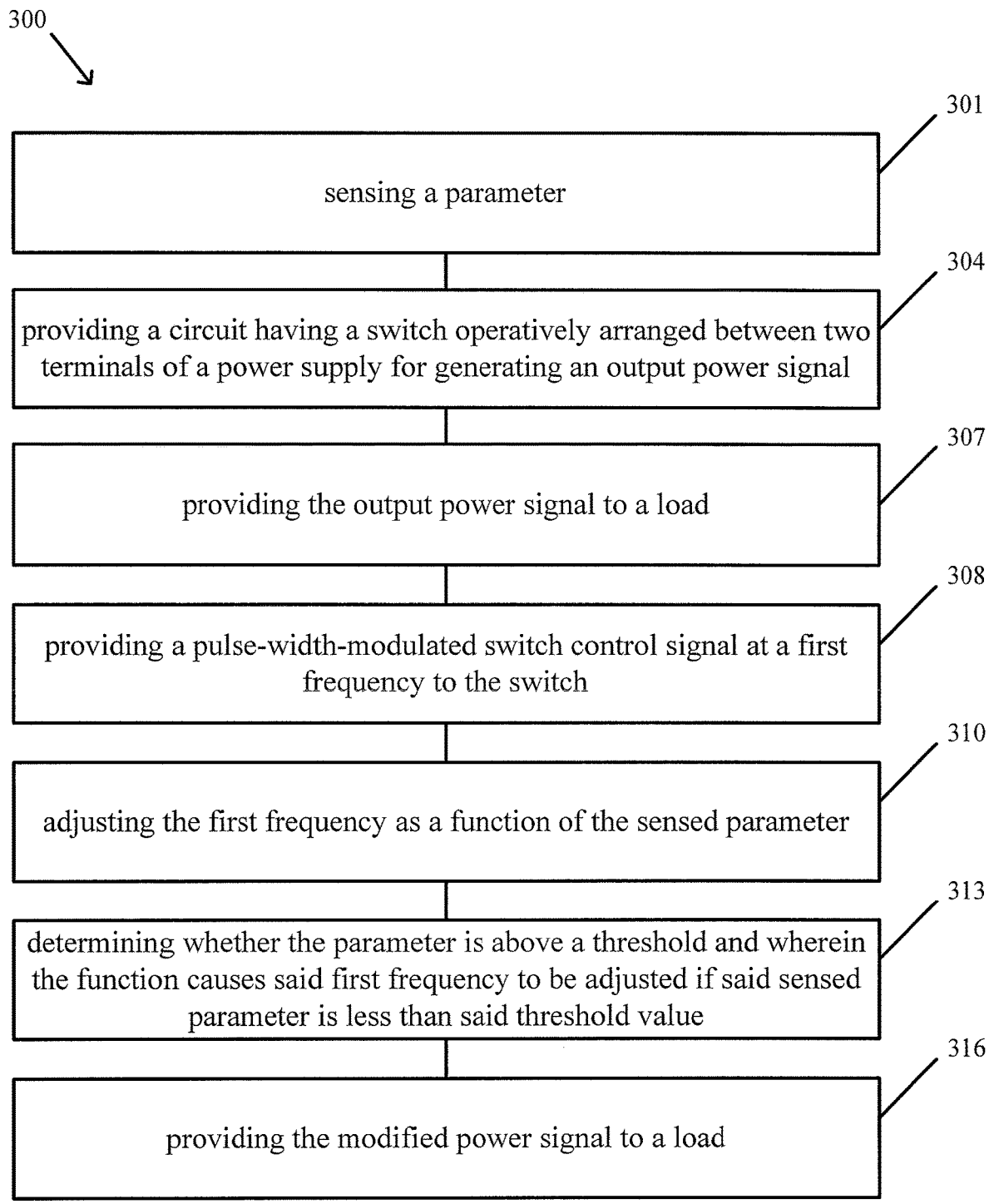
FIG. 3 is a block diagram showing a series of steps in practicing a second method.

FIG. 3 is a flow diagram of another form of the improved method 300. Method 300 includes the steps of: sensing a parameter (as indicated in box 301); providing a circuit having a switch operatively arranged between two terminals of a power supply for generating an output power signal (as indicated in box 304); providing the output power signal to a load (as indicated in box 307); providing a PWM switch control signal at a first carrier frequency to the switch (as, indicated in box 308); adjusting the first frequency as a function of the sensed parameter (as indicated in box 310); determining whether the parameter is above a threshold value stored in the memory; wherein the function causes the first carrier frequency to be adjusted if the sensed parameter is less than the threshold value (as indicated in box 313); and providing the modified output power signal to the load (as indicated in box 316).

Figure 4:
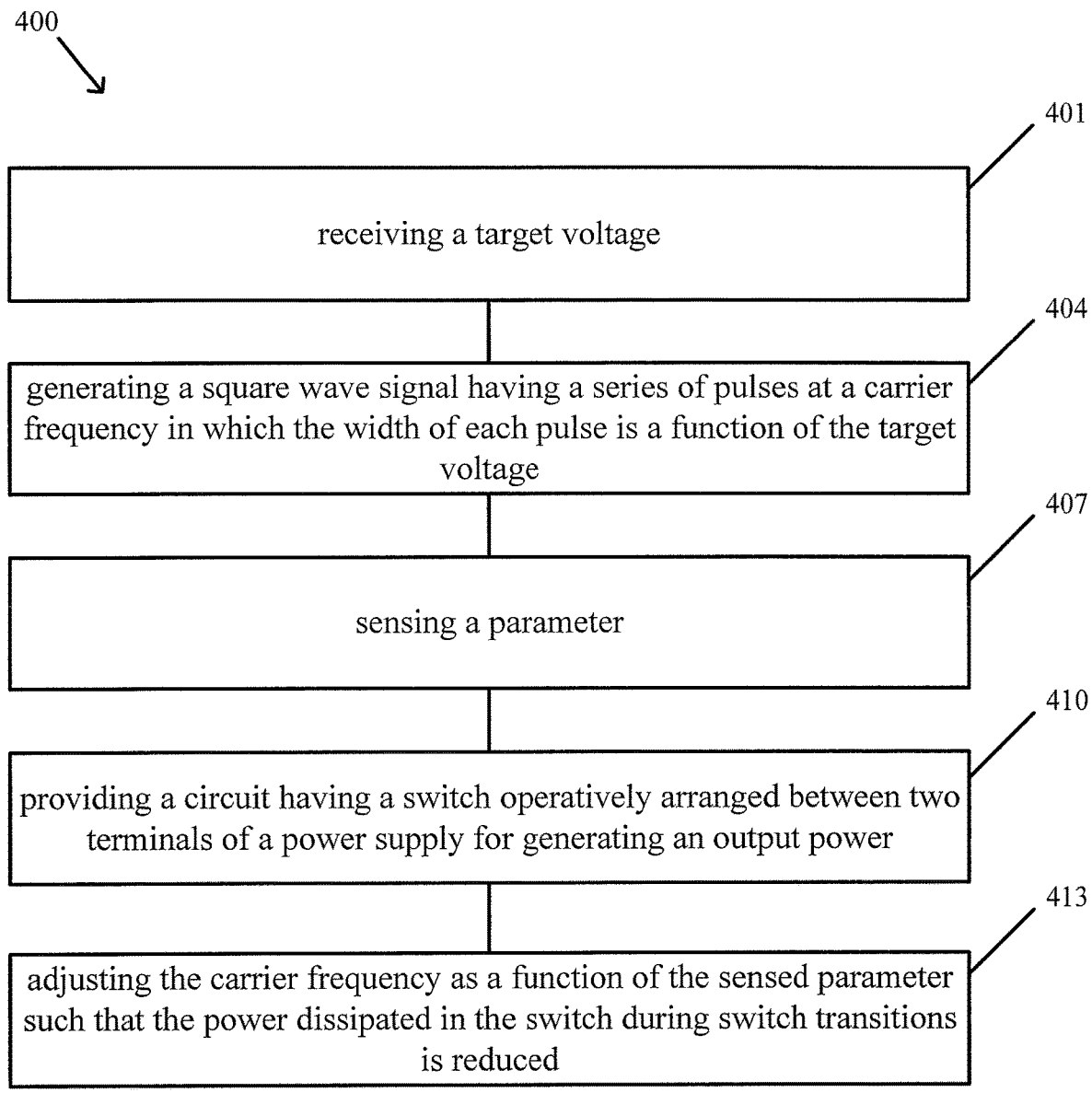
FIG. 4 is a block diagram showing a series of steps in practicing a third method.

FIG. 4 is a block diagram of another way of practicing the improved method. This method 400 is shown as including the steps of: receiving a target voltage (as indicated in box 401); generating a square wave signal having a series of pulses at a carrier frequency in which the width of each pulse is a function of the target voltage (as indicated in box 404); sensing a parameter (as indicated in box 407); providing a circuit having a switch operatively arranged between two terminals of a power supply for generating an output power (as indicated in box 410); and adjusting the carrier frequency as a function of the sensed parameters such that the power dissipated in the switch during switch transitions is reduced (as indicated in box 413).

As previously noted, the sensed parameter(s) may be current, temperature, voltage, speed, position, torque, force, or some other parameter. The sensed parameter may be of the switch network, or of the load, as desired. The load is not limited to use with a rotary motor. Indeed, the load could be a linear motor, or some other type of load.

Figure 5:
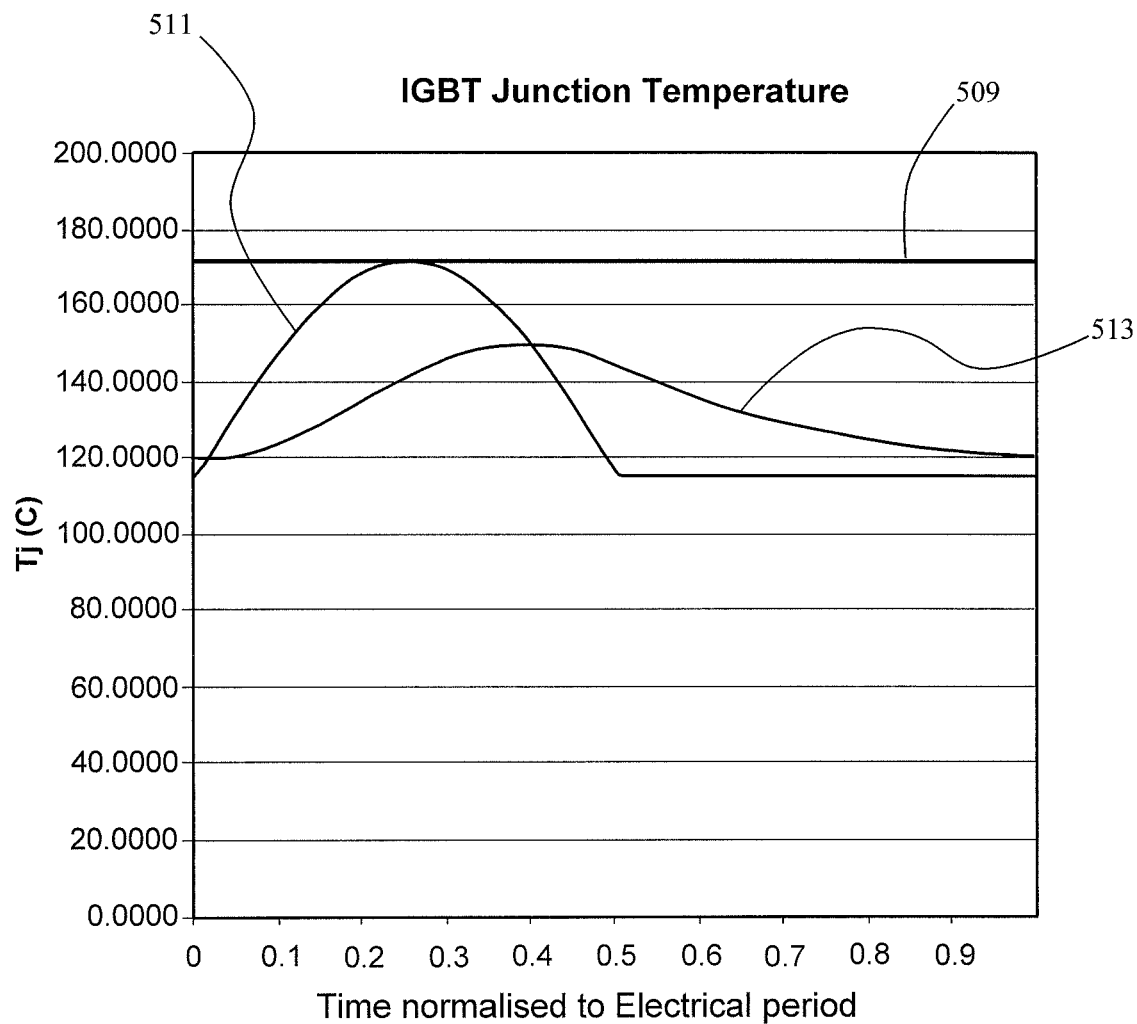
FIG. 5 is a plot of temperature (ordinate) vs. time (abscissa) showing the temperature of a switch during operation at different motor speeds (at 8 kHz), with this plot expressing time as being normalized to the electrical period.

FIG. 5 is a plot of switch temperature (ordinate) vs. time (abscissa) at various rotational speeds of a rotary electric motor load at an 8 kHz carrier frequency. This plot shows that at a stall speed, the temperature rises to a maximum junction temperature 509 of about 170° C. However, as the rotational speed of the rotor increases relative to the stator, the sensed temperature of the motor progressively decreases below this maximum value at a stalled condition. Curve 511 shows the temperature in the switch for a low rotation rate of the motor where the maximum temperature is reached. Curve 513 represents the temperature when the motor is revolving at higher speeds.

Figure 6:
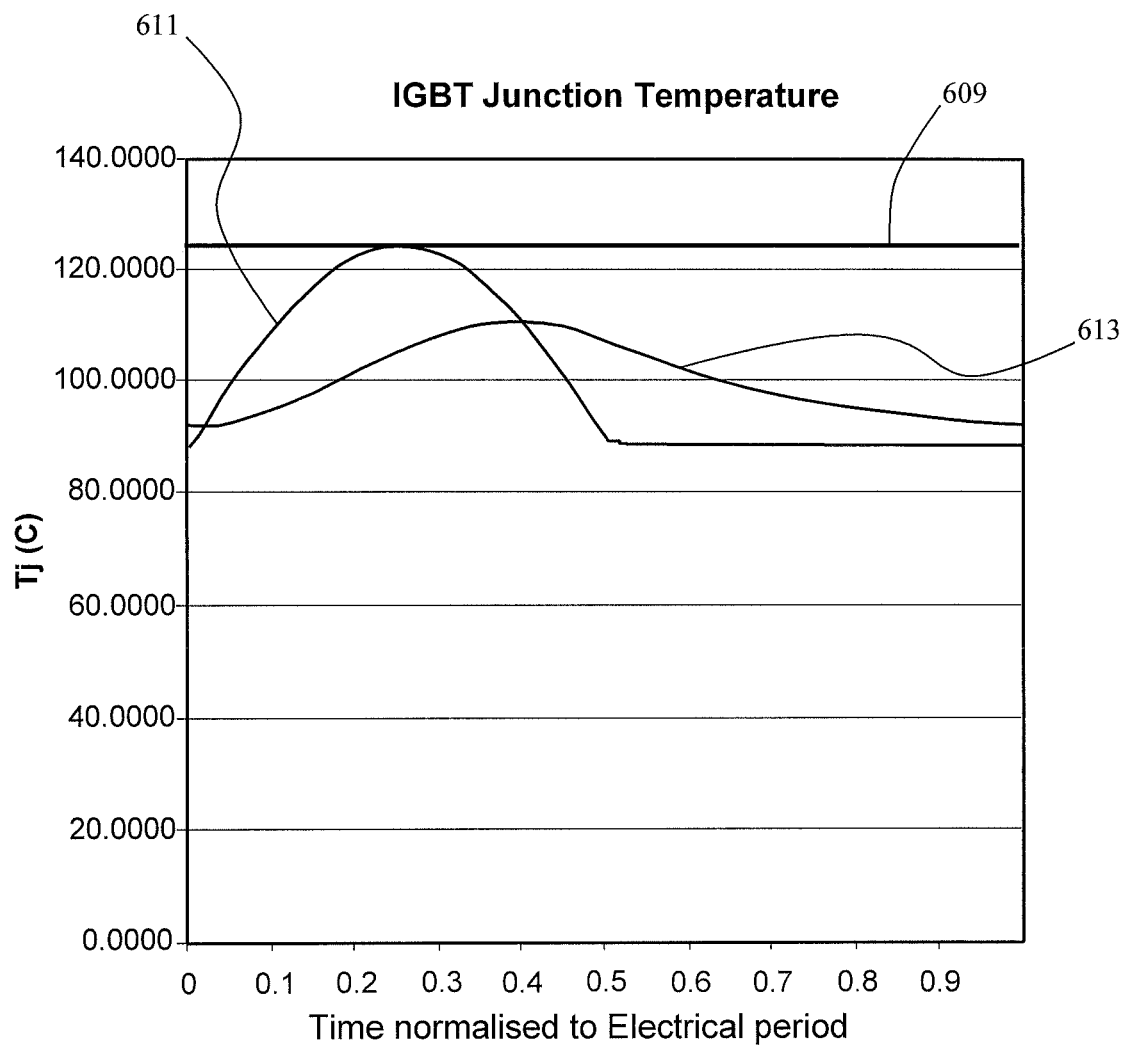
FIG. 6 is a plot of temperature (ordinate) vs. time (abscissa) showing the temperature of a switch during operation at different motor speeds (at 4 kHz), with this plot expressing time as being normalized to the electrical period.

Referring now to FIG. 6, this is a plot generally similar to FIG. 5, but shows the switch temperature at various rotational speeds of the motor when the carrier frequency is 4 kHz. This plot shows that, proximate the stall speed, the temperature of the motor quickly rises to a maximum junction temperature 609 of about 123° C. However, as the rotor rotational speed progressively increases above this stall speed, as represented by the other curves in FIG. 6, the sensed temperature of the motor decreases. Here again, this curve shows generally how temperature of the motor increases to a maximum proximate the stall speed of the motor. Curve 611 shows temperature in the switch for low rotation rate of motor where maximum temperature is reached. Curve 613 represents the temperature when the motor is revolving at higher speeds.

Figure 7:
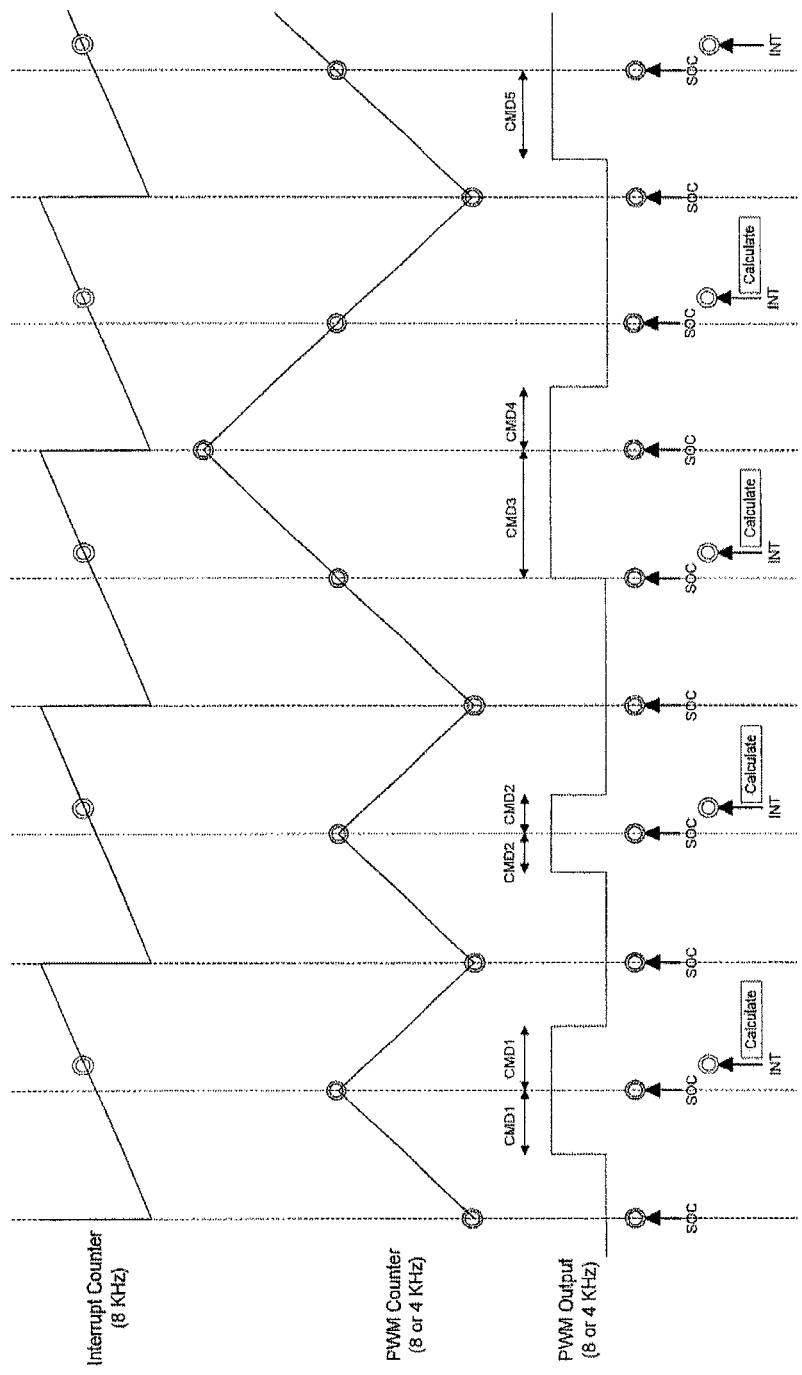
FIG. 7 is a plot showing the dynamic PWM timing of the improved apparatus, with this plot showing a plurality of dimensionless counts (ordinate) as a function of time (abscissa).

FIG. 7 is a graph of a technique for generating the PWM signals on a controller, which shows the PWM carrier frequency changing from 8 kHz to 4 kHz. An interrupt counter is configured to operate at 8 kHz. More specifically, an interrupt count register on the controller is configured to hold an integer value which is incremented at a specific rate. When the interrupt counter value reaches a target value, its value is reset to zero and is and continues to be incremented at a specific rate. The rate and target value are selected such that the counter is reset at a rate of 8kHz.

FIG. 7 also shows a PWM counter which is configured and arranged to operate with a carrier frequency at either 4 kHz or 8 kHz. More specifically, the PWM counter is an integer variable which is incremented at a specific rate until it reaches a PWM counter value target, and is then decremented at the same rate until it reaches zero. When the PWM counter reaches zero, it repeats the cycle of incrementing and decrementing. The PWM counter target value and increment/decrement rate are selected such that the PWM counter completes an up down cycle at a target carrier frequency. The target carrier frequency is adjusted by adjusting the PWM counter target value. As shown in FIG. 7, the PWM counter target value is adjusted from a nominal value in the beginning of the graph to a value two times the nominal value starting with the third PWM cycle, indicated at 703. This causes the PWM counter cycle to adjust from 8 kHz to 4 khz.

The PWM counter signal is used to generate the PWM output. The PWM output is a square wave signal with a frequency equal to the PWM counter cycle frequency, and a width that is determined as a function of the target output voltage to be produced on the output bus. As shown in FIG. 7, the width of each pulse of the PWM output varies over time. For example, the first PWM output pulse, indicated at 701, has a width that is equal to 2×CMD1. The width of the second pulse, indicated at 702, is 2×CMD2. The width of the PWM pulses is varied a function of a target voltage to be produced on the output of the switch network output bus 132.

The carrier frequency of the PWM counter is dynamically changed when the load experiences a condition, such as a stall condition. More specifically, the controller changes the PWM counter carrier frequency by changing the PWM counter target value as a function of a received feedback signal In one form, the feedback signal is a speed that an electrical motor load is rotating. When this speed is greater than a threshold, the PWM output carrier frequency is set to 8 kHz. When the speed parameter drops below the threshold, the PWM counter frequency is adjusted from 8 kHz to 4 kHz. When the speed returns to a value above the threshold, the PWM carrier frequency is set back to 8 kHz.

Figure 8:
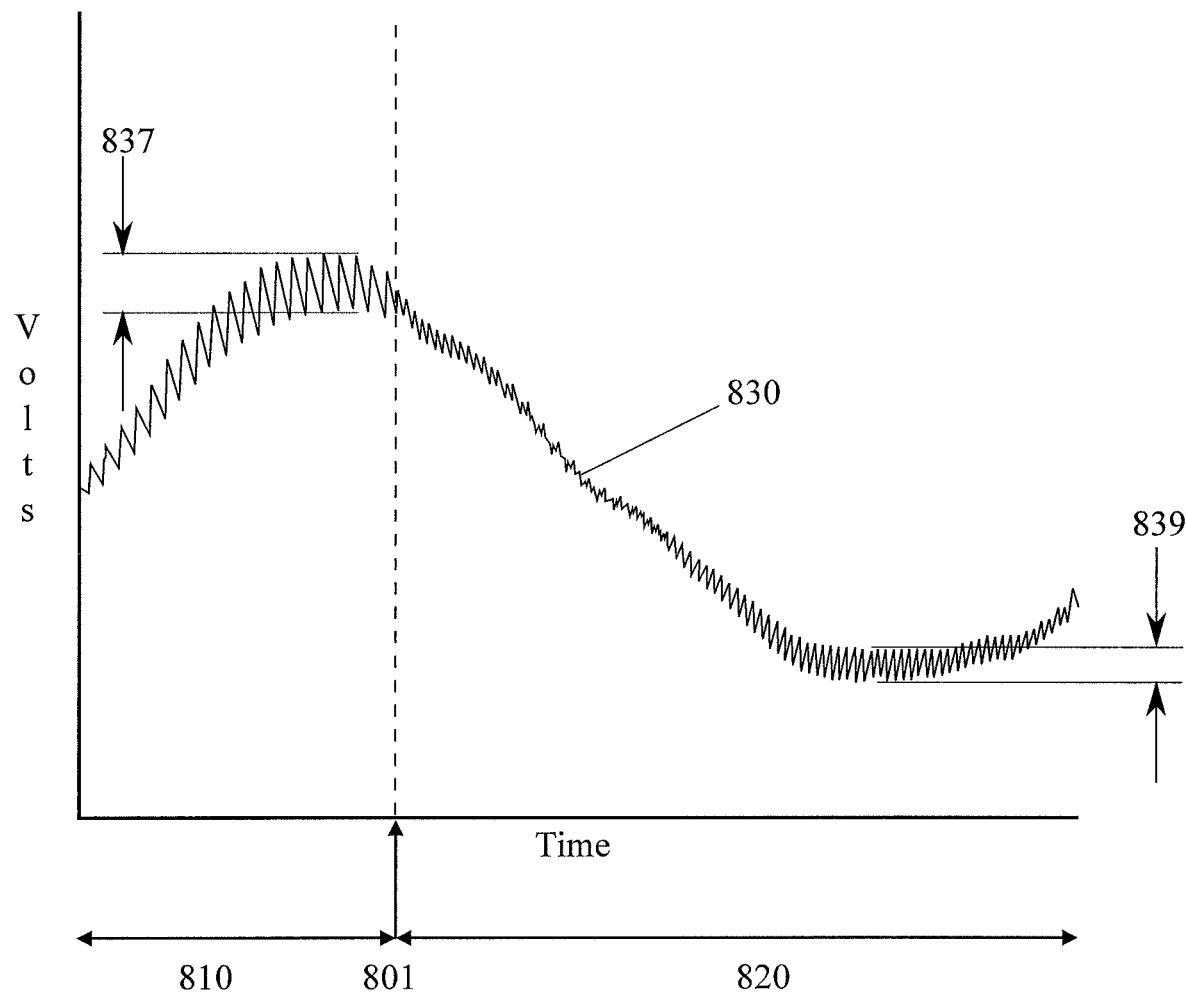
FIG. 8 is a plot of voltage (ordinate) vs. time (abscissa) showing how the ripple changes during a change in the carrier frequency from 4 kHz to 8 kHz.

FIG. 8 depicts a voltage (y-axis) vs. time (x-axis) curve of the voltage at output bus 132 during normal operation. As shown in FIG. 8, there is a critical time period 801. Critical time period 801 separates first time period 810 and second time period 820. Voltage ripples are shown on output voltage curve 830. The magnitude 837 of the voltage ripples in first period 810 is greater than the magnitude 839 of the voltage ripples in second time period 820. Time period 810 represents a period when the PWM carrier frequency is operating at 4 kHz. At time event 801, the controller senses that the feedback parameter passes below a threshold, which causes the controller to change the PWM carrier frequency from 4 kHz to 8 kHz. Changing the carrier frequency from 4 kHz to 8 kHz causes the voltage ripple to decrease in magnitude.

When the feedback parameter (e.g. the rotational speed of a rotor) drops below a certain threshold), the temperature of a switch in the switch network is typically much higher than operation at a higher RPM. More specifically, for typical switches, heat is dissipated during a PWM transition period. In other words, when the switch is changing from an "on" to an "off" state, or from an "off" state to an "on" state, this causes more heat to be generated in the switch than when the switch is "on" or when the switch is "off". The magnitude of heat generated is also a function of the magnitude of current passing through the switch. Because for low RPMs the load is pulling a larger magnitude current from the switch network, the heat dissipated in a switch is of greater concern than when the motor load is operating at a higher speed. In order to prevent the switch from reaching a critical temperature, the controller senses this drop in RPM and causes the rate of PWM transitions to decrease. More specifically, the PWM carrier frequency, which is the frequency of switch transitions, is reduced from 8 kHz to 4 kHz when the speed feedback drops below the threshold. This prevents a switch inside a switch network from reaching a temperature that is higher than a critical temperature. When the motor speed increases above the threshold, the controller switches the PWM carrier frequency from 4 kHz back to 8 kHz. A higher PWM carrier frequency is generally desired in order to keep the voltage ripples at a low level.

In summary, the controller dynamically changes the PWM carrier frequency in order to ensure that the switches do not reach critical temperature when a load motor speed drops below a critical value. In addition, when the load motor speed is above a critical value, the controller adjusts the PWM carrier frequency back to a higher carrier frequency in order to ensure that the voltage ripple on the output is low. Additional control parameters and algorithms may be used by the controller to monitor and adjust the operation of the switch network and/or keep feedback parameters within a desired range.

Figure 9:
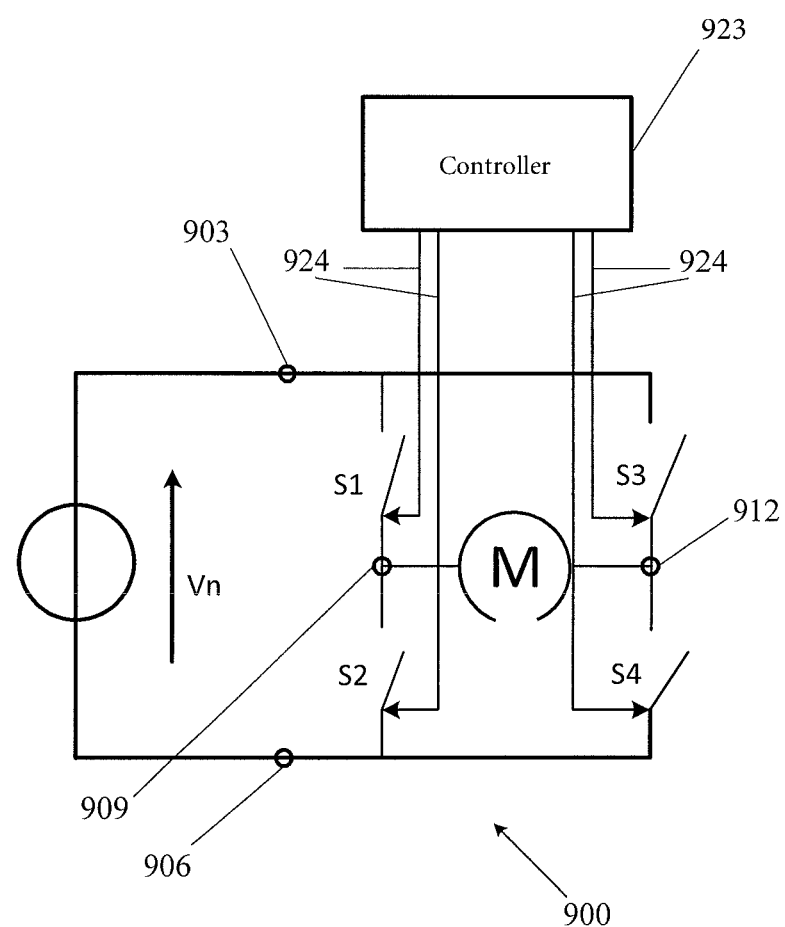
FIG. 9 is a schematic of an H-bridge switching network.

FIG. 9 shows one form of a switch network 126 implemented as an H-bridge 900 and having four switches (S1, S2, S3, S4). As shown, the H-bridge 900 is connected to a power source Vn having terminals 903, 906. The power source Vn is connected to a load M via H-bridge 900. Switches S1 and S2 are arranged in series with Vn. Similarly, switches S3 and S4 are also arranged in series with Vn and in parallel to switches S1 and S2 as shown. One terminal 909 of load M is connected between S1 and S2 and a second terminal 912 of load M is connected between S3 and S4. The gates of switches S1, S2, S3, and S4 are driven by PWM gate signals 924 from a controller 923 as described above.

As an additional example, the PWM carrier frequency may be adjusted in order to balance tradeoffs between switch network efficiency and noise levels on the voltage output. Switch network efficiency is generally greater with a lower PWM carrier frequency, but noise levels are typically greater with a lower PWM carrier frequency. This is because the heat dissipated in a switch network is generally lower when the frequency or the number of switch transitions is lower. Additionally, the controller may also monitor a parameter synonymous with current levels and adjust PWM carrier frequency as a function of the current level.

Figure 10:
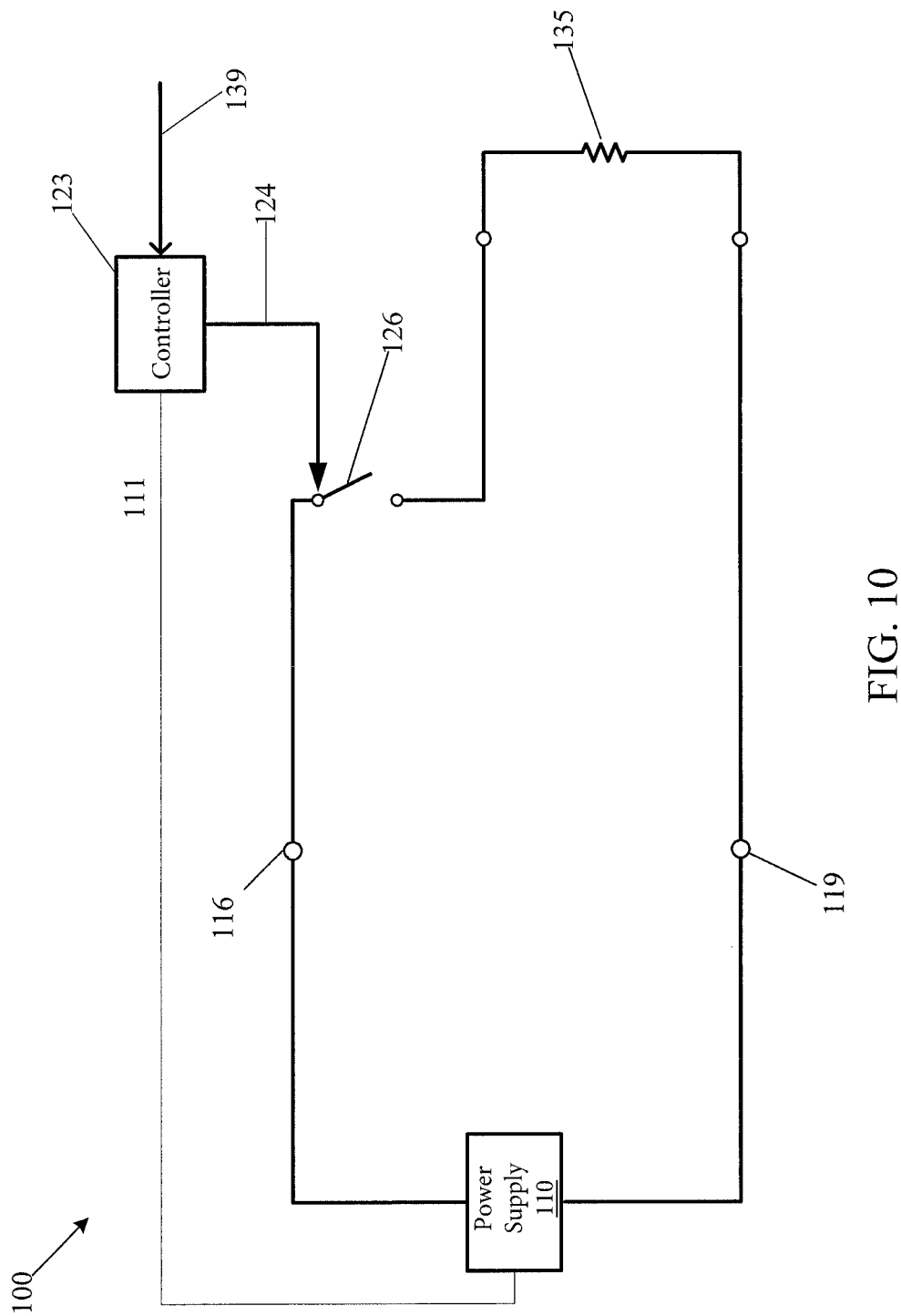
FIG. 10 is a circuit diagram of a second embodiment for controlling and providing a voltage converter with a PWM switch.

Turning to FIG. 10, apparatus 100 is generally similar to apparatus 10, with the fundamental difference that power supply 13 is replaced with variable power supply 110. Variable power supply 110 receives power supply command 111 from controller 123. The power provided by power supply 110 to terminals 116 and 119 is a function of power supply command 111. More specifically, in this embodiment power supply command 111 is a voltage command, and power supply 110 adjusts the voltage between terminal 116 and terminal 119 to be equal to a target voltage level specified in the voltage command 111. In other embodiments, power supply command 111 may be a current command, and power supply 110 may vary the current output between terminals 116 and 119 as a function of the current command. Controller 123 adjusts power supply command 111 as a function of feedback 139. For example, in this embodiment feedback 139 represents a measured temperature of switch 126. Controller 123 is configured to send power supply command 111 to power supply 110 with a first target voltage level when the temperature in feedback 139 is below a first temperature threshold. Also, PWM signals are provided to switch 126 by controller 123 at a given PWM carrier frequency. The width of each PWM pulse is controlled in order to provide load 135 with a target voltage or current.

When feedback 139 indicates that the temperature of switch 126 is exceeding the first temperature threshold, controller 123 will modify power supply command 111 to now send a second target voltage to power supply 110. In this embodiment, however, when feedback 129 exceeds the temperature threshold, the PWM frequency is not changed as in apparatus 10. In this embodiment, switch 126 thus experiences the same number of on-to-off and off-to-on transitions over time regardless of whether feedback 139 is over or under the temperature threshold.

By modifying the voltage provided by power supply 110 after feedback 139 exceeds the temperature threshold, the heat dissipation in switch 126 is reduced since the voltage drop that switch 126 must transition through during off-to-on and on-to-off transitions is changed. When the temperature of switch 126 drops back below the temperature threshold as indicated in feedback 139, controller 123 then reverts back to sending power supply 110 the original target voltage in power supply command 110.

As previously noted, the load may be an electric motor, such as a rotary or linear motor. However, the load may be some other form as well. The sensed parameter may be current, temperature, voltage, speed, positions, torque, force or vibration or noise, the switch may be an IGBT, a power transistor, a MOSFET, an active diode or the like. The controller may include a CPU, a microprocessor, a microcontroller, a programmable logic device, an integrated circuit, or the like.

Therefore, while the present embodiments and methods have been shown and described, and various modifications thereof discussed, persons skilled in this art will readily appreciate various additional changes and modifications may be made without departing from the spirit of the invention, as defined and differentiated by the following claims.

What is claimed is:

1. A method of providing a pulse-width-modulated (PWM) signal, comprising the steps of:
   providing a circuit having two power supply terminals and having a switch operatively arranged between the two power supply terminals, the circuit controlling an output power;
   providing a PWM counter operable to adjust a rate of PWM transitions to the switch;
   providing a PWM signal at a first rate of PWM transitions to the switch;
   providing the output power to a motor having one member mounted for movement relative to another member;
   receiving a sensed parameter comprising a speed of the one member relative to the other member; and
   selectively providing the PWM signal at a second rate of PWM transitions to the switch as a function of the sensed parameter, wherein the PWM signal is provided at the second rate of PWM transitions when a PWM counter target value is adjusted from a first value to a second value that is twice the first value;
   whereby the power dissipated in the switch during switch transitions is changed with the rate of PWM transitions to maintain a temperature of the switch below a critical value.

2. The method as set forth in claim 1, further comprising the step of comparing the sensed parameter to a threshold value, wherein the function provides the PWM signal at the second rate of PWM transitions to the switch if the sensed parameter is less than the threshold value.

3. The method as set forth in claim 1, further comprising the step of:
   comparing the sensed parameter to a threshold value;
   wherein the function adjusts the PWM signal from the first rate of PWM transitions to the second rate of PWM transitions if the sensed parameter is less than or equal to the threshold value; and
   wherein the threshold value is a stall speed of the motor.

4. The method of claim 1, wherein adjusting the rate of PWM transitions of the PWM signal as a function of the parameter further comprises,
   comparing the sensed parameter to a threshold value;
   providing a first PWM gate signal to the switch at a first rate of PWM transitions if the sensed parameter is below the threshold value; and
   providing a second PWM gate signal to the switch at a second rate of PWM transitions if the sensed parameter is above the threshold value.

5. A method of controlling and providing a switch control signal, comprising the steps of:
   receiving a target voltage;
   generating a first square wave signal comprising, a first rate of PWM transitions, having a series of pulses, wherein the width of each pulse is a function of the target voltage;
   sensing a parameter comprising a speed of a motor;
   providing a circuit having a switch adapted to be operatively arranged between two terminals of a power supply for controlling an output power to the motor;
   providing a PWM counter operable to adjust a rate of PWM transitions to the switch;
   providing the first square wave signal to the switch; and
   selectively generating a second square wave signal, comprising a second rate of PWM transitions, having a series of pulses as a function of the sensed parameter such that the power efficiency of the switch during switch transitions is changed to maintain a temperature of the switch below a critical value, wherein the second square wave signal is generated when a PWM counter target value is adjusted from a first value to a second value that is twice the first value, and
   wherein the function is operable to ensure a low voltage ripple via adjusting the rate of PWM transitions to the switch back to the first rate of PWM transitions to the switch when the sensed parameter is greater than the threshold value.

6. An apparatus for providing a control signal to a circuit having a switch operatively associated with a power supply and a load comprising an electric motor, the apparatus comprising:
   a sensor operatively arranged to sense the value of a parameter comprising a speed of the motor; and
   a controller that provides a PWM control signal at a first rate of PWM transitions to the switch, the controller in communication with the sensor and configured and arranged to selectively provide the PWM control signal at a second rate of PWM transitions to the switch as a function of the sensed parameter;
   a PWM counter operable to adjust a rate of PWM transitions to the switch, wherein the second rate of PWM transitions to the switch is generated when a PWM counter target value is adjusted from a first value to a second value that is twice the first value;
   whereby the power dissipated in the switch during switch transitions is adjusted to maintain a temperature of the switch below a critical value.

7. The apparatus as set forth in claim 6 wherein the switch is selected from a group consisting of an IGBT, a power transistor, a MOSFET, and an active diode.

8. The apparatus as set forth in claim 6, wherein the controller is selected from a group consisting of a CPU, a microprocessor, a microcontroller, a programmable logic device, and an integrated circuit.

9. The apparatus as set forth in claim 6, wherein the power supply is arranged to provide one of direct and alternating current.

10. The apparatus as set forth in claim 6, further comprising:
- a memory for storing a threshold value of a sensed parameter; and
- a comparator for comparing the value of the sensed parameter with the stored threshold value; and
- wherein the controller is arranged to provide the pulse-width-modulated control signal at the first rate of PWM transitions when the sensed parameter value is greater than the stored threshold parameter value; and
- wherein the controller is arranged to provide the pulse-width-modulated control signal at the second rate of PWM transitions when the sensed parameter is less than or equal to the stored threshold value, the second frequency being different than the first frequency.

11. The apparatus as set forth in claim 6, wherein the circuit comprises an H-bridge.

* * * * *